US011173425B1

(12) United States Patent
Kulbeth

(10) Patent No.: US 11,173,425 B1
(45) Date of Patent: Nov. 16, 2021

(54) VERTICAL GAS DIFFUSING DEVICE

(71) Applicant: DEL Corporation, Lafayette, LA (US)

(72) Inventor: Robert M. Kulbeth, Church Point, LA (US)

(73) Assignee: DEL Corporation, Lafayette, LA (US)

( * ) Notice: Subject to any disclaimer, the term of this patent is extended or adjusted under 35 U.S.C. 154(b) by 327 days.

(21) Appl. No.: 16/529,513

(22) Filed: Aug. 1, 2019

(51) Int. Cl.
  *B01D 19/00* (2006.01)
  *E21B 43/34* (2006.01)
  *B01D 21/24* (2006.01)
  *B01D 21/00* (2006.01)
  B01D 21/02 (2006.01)

(52) U.S. Cl.
  CPC ....... *B01D 21/245* (2013.01); *B01D 19/0042* (2013.01); *B01D 21/0048* (2013.01); *B01D 21/2494* (2013.01); *E21B 43/34* (2013.01); *B01D 21/0006* (2013.01); *B01D 21/0042* (2013.01); *B01D 21/02* (2013.01); *B01D 2221/04* (2013.01)

(58) Field of Classification Search
  CPC ............ B01D 19/0042; B01D 21/0042; B01D 21/0048; B01D 21/245; B01D 21/2494; E21B 43/34; E21B 43/35
  USPC .......... 210/800, 188, 521, 539; 95/260, 262; 96/182, 183; 166/267, 75.12
  See application file for complete search history.

(56) References Cited

U.S. PATENT DOCUMENTS

| | | | |
|---|---|---|---|
| 4,173,533 A * | 11/1979 | Williams ........... | B01D 17/0205 210/800 |
| 4,252,649 A * | 2/1981 | Favret, Jr. .......... | B01D 17/0208 210/800 |
| 4,737,282 A * | 4/1988 | Senyard, Sr. ........... | E21B 43/34 210/188 |
| 5,922,064 A * | 7/1999 | Gordon, Sr. .............. | C02F 1/40 210/521 |
| 6,506,310 B2 | 1/2003 | Kulbeth | |
| 6,808,354 B1 | 10/2004 | Kulbeth | |
| 6,808,626 B2 | 10/2004 | Kulbeth | |
| 6,976,819 B2 | 12/2005 | Kulbeth | |
| 7,514,011 B2 | 4/2009 | Kulbeth | |

(Continued)

OTHER PUBLICATIONS

Applicant's copending U.S. Appl. No. 16/131,900, filed Sep. 14, 2018.

(Continued)

*Primary Examiner* — Christopher Upton
(74) *Attorney, Agent, or Firm* — Jones Walker LLP

(57) ABSTRACT

An assembly for diffusing gas from a first slurry having an open-bottomed housing having an opening for conveying a second slurry from inside of the housing to outside of the housing. The assembly includes one or more intake conduits extending through an upper mid-portion of the housing for receiving the first slurry, and a gas diffusing channel formed in the housing for conveying diffused gas from the liquid from inside of the housing to outside of the housing. The assembly includes a dumping assembly having a dump valve used to convey fluid from an upper layer of fluid located inside of the housing to outside of the housing. The assembly may include a recirculation pump and a suction conduit coupled to the pump for pumping fluid (dyed fluid) from inside of the housing. The assembly is configured to be partially submerged in liquid, such as in a tank.

40 Claims, 8 Drawing Sheets

(56) References Cited

U.S. PATENT DOCUMENTS

| | | | |
|---|---|---|---|
| 7,785,400 B1* | 8/2010 | Worley | B01D 19/0042 |
| | | | 95/262 |
| 8,449,779 B2 | 5/2013 | Thompson | |
| 8,517,167 B2 | 8/2013 | Thompson | |
| 8,623,221 B1* | 1/2014 | Boyd | B01D 19/0042 |
| | | | 210/539 |
| 9,498,739 B2 | 11/2016 | Thompson | |
| 9,597,614 B2 | 3/2017 | Thompson | |
| 9,687,761 B2 | 6/2017 | Thompson | |
| 10,751,654 B1* | 8/2020 | Kulbeth | E21B 43/34 |
| 10,773,188 B1* | 9/2020 | Kulbeth | E21B 43/34 |
| 10,857,488 B1* | 12/2020 | Kulbeth | B01D 21/2494 |
| 2005/0016937 A1* | 1/2005 | Smullin | B01D 21/2494 |
| | | | 210/800 |
| 2012/0132079 A1* | 5/2012 | Naess | B01D 19/0057 |
| | | | 96/182 |
| 2015/0273361 A1* | 10/2015 | Buckner | B01D 21/0048 |
| | | | 210/800 |

OTHER PUBLICATIONS

Applicant's copending U.S. Appl. No. 16/227,417, filed Dec. 20, 2018.

Applicant's copending U.S. Appl. No. 16/229,324, filed Dec. 12, 2018.

Applicant's copending U.S. Appl. No. 16/290,350, filed Mar. 1, 2019.

Applicant's copending U.S. Appl. No. 16/393,718, filed Apr. 24, 2019.

\* cited by examiner

VERTICAL GAS DIFFUSING DEVICE

BACKGROUND OF THE DISCLOSURE

The disclosure relates to a vertical gas diffusing assembly, and specifically to a vertical gas buster device for use in a tank assembly.

SUMMARY OF THE DISCLOSURE

The gas diffusing assembly of the present disclosure is used to diffuse gas from a liquid, such as from first slurry recovered from a hydrocarbon well. The assembly may have an open-bottomed housing having an opening configured for conveying a second slurry from inside of the housing to outside of the housing. The assembly may include one or more intake conduits extending through an upper part of the mid-portion of the housing for receiving the first slurry recovered from the hydrocarbon well, and may include a gas diffusing channel formed in the housing for conveying diffused gas from the first slurry from inside of the housing to outside of the housing. The assembly may include a dumping assembly having a dump valve used to convey fluid from an upper layer of fluid located inside of the housing to outside of the housing, such as to a sump or to a conduit. The assembly may include a recirculation pump and a suction conduit coupled to the recirculation pump for pumping fluid (e.g., dyed fluid) from inside of the housing. The assembly may be configured to be partially submerged in liquid, such as in a tank.

Some conventional gas diffusing devices (gas busters) use a U-shaped tube to hold fluid at a particular level to generate the pressure used to diffuse gas from a liquid. In such cases, solids build up at the bottom of the gas diffusing device, and a valve at the bottom of the gas diffusing device needs to be opened periodically by a person to dump the solids. Some other conventional gas diffusing devices sit separately outside of an operation tank, and solids collect at the bottom of the gas diffusing device during operation. These conventional gas diffusing devices have an auger located at the bottom, which may operate to move the solids out of the gas diffusing device and back in to the operation tank. These gas diffusing devices, however, are located outside of the tank and involve a complex setup.

The gas diffusing assembly of the present disclosure addresses this drawback by having the solids fall through the open bottom so no solids build up inside of the gas diffusing assembly. This eliminates the operator from having to dump the solids, thus avoiding situations of human error.

DETAILED DESCRIPTION OF THE DISCLOSURE

Figure 1:
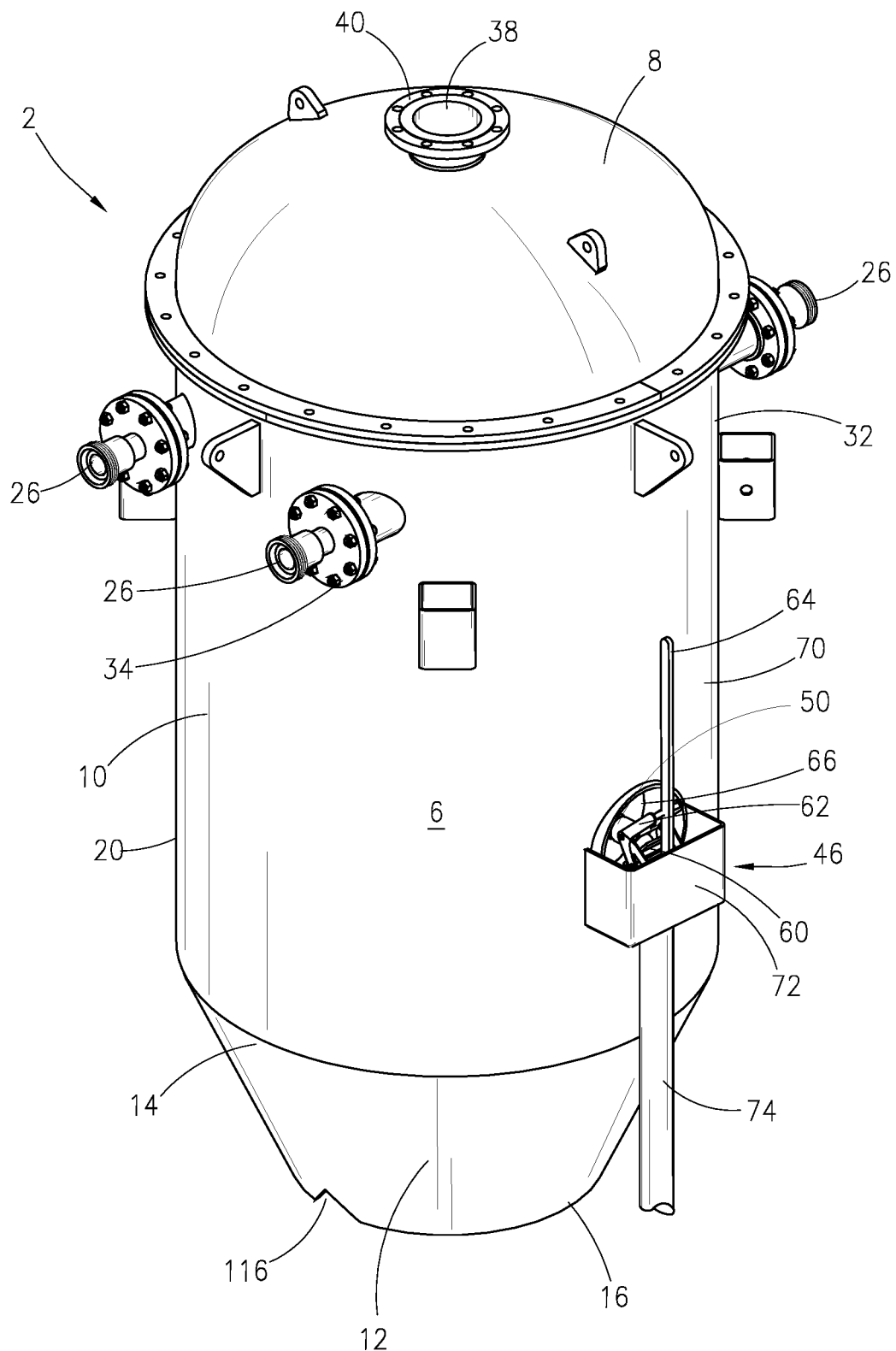
FIG. 1 is a perspective view of an embodiment of a gas diffusing assembly in accordance with disclosed aspects.
Figure 2:
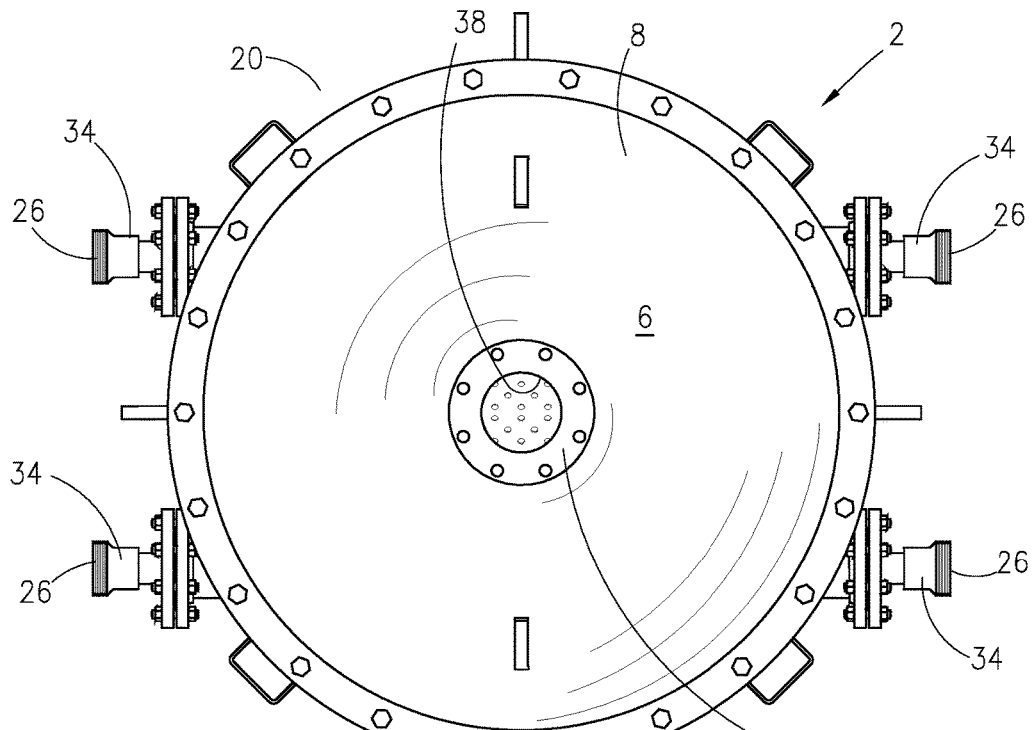
FIG. 2 is a top view of an embodiment of a gas diffusing assembly in accordance with disclosed aspects.

With reference to the figures where like elements have been given like numerical designation to facilitate an understanding of the present disclosure, and particularly with reference to the embodiment of the vertical gas diffusing assembly illustrated in FIGS. 1-9, vertical gas diffusing assembly 2 may include an open-bottomed housing 6, one or more intake conduits 26, a gas diffusing channel 38, and a dumping assembly 46. As shown in FIGS. 5-9, the assembly 2 may include a recirculation pump 78 and a curved conduit 80 coupled to the recirculation pump 78.

The assembly 2 may be configured for use in combination with a tank system 108, such as being partially submerged in liquid in the tank 108 (FIGS. 5-9). The tank 108 (or any feature associated therewith) may be or include any of the features or components in U.S. patent application Ser. No. 16/227,417 (entitled, "FLOW BACK SEPARATION SYSTEM AND METHOD"), filed Dec. 20, 2018; U.S. patent application Ser. No. 16/229,324 (entitled, "AIR DRILLING SOLIDS CONTROL SYSTEM AND METHOD"), filed Dec. 21, 2018; U.S. patent application Ser. No. 16/131,900 (entitled, "SYSTEM FOR SEPARATING SOLIDS FROM A FLUID STREAM"); U.S. patent application Ser. No. 16/290,350 (entitled, "RETRACTABLE SHAKER DAM ASSEMBLY AND METHOD"), filed Mar. 1, 2019; and U.S. patent application Ser. No. 16/393,718 (entitled, "DRILL CUTTINGS TREATMENT ASSEMBLY"), filed Apr. 24, 2019, which are incorporated by reference in their entirety for any and all purposes.

According to some aspects, assembly 2 may receive fluid containing solids, such as slurry 4 (FIG. 9), from a hydrocarbon well, and function to remove or diffuse entrained gas (gas 42 in FIG. 9) present in the fluid. After removing entrained gas, assembly 2 discharges the degassed fluid containing solids 110 (second slurry 24) into a compartment of tank 108. Assembly 2 may be used in conjunction with one or more other assemblies 2, such as operating a plurality of assemblies 2 in combination in a tank system 108. Assembly 2 may be used with one or more other vertical gas diffusing devices and/or one or more other horizontal gas diffusing devices, such as described in the above documents that are incorporated by reference.

Figure 9:
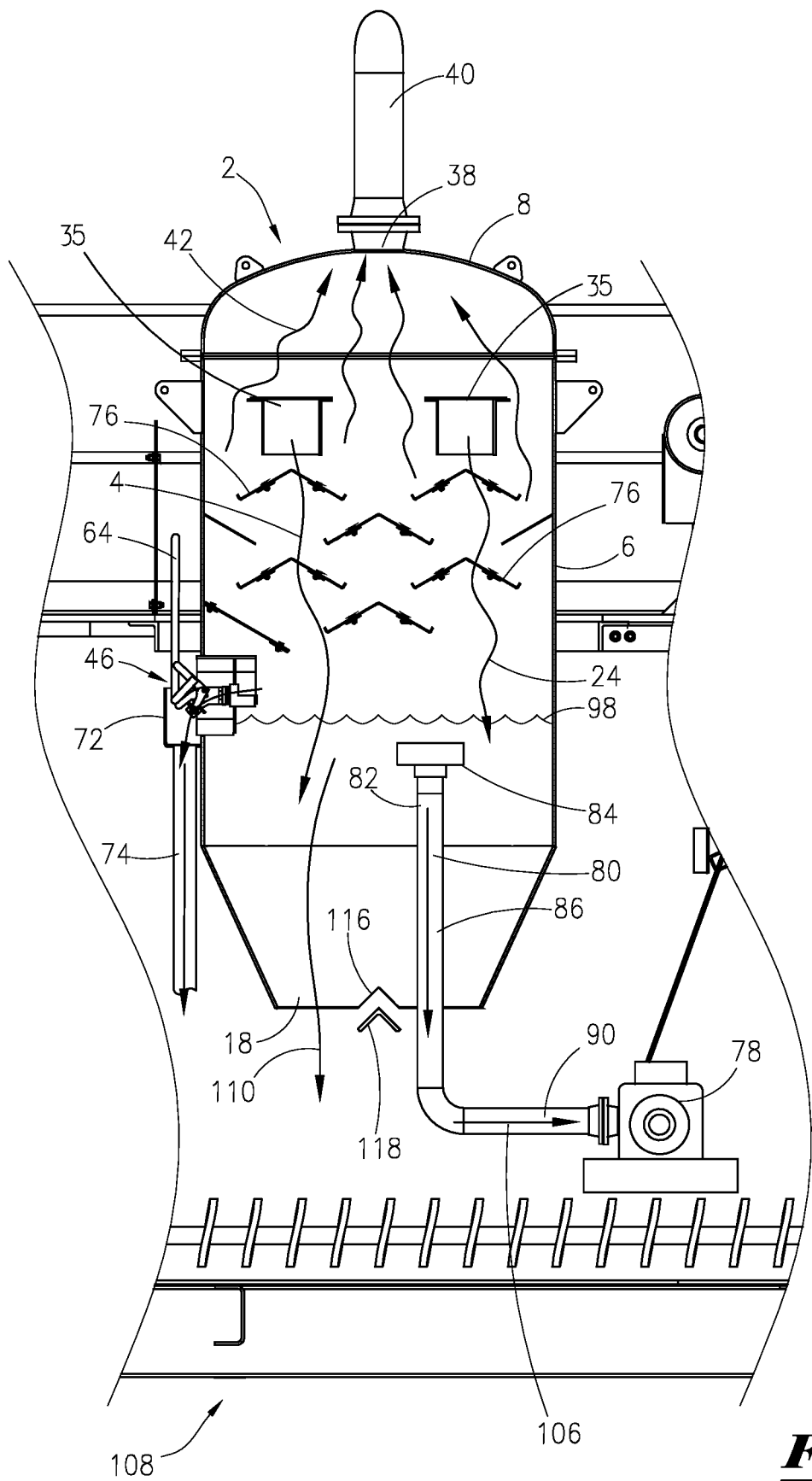
FIG. 9 is a schematic diagram of an embodiment of a gas diffusing assembly in combination with a tank system in accordance with disclosed aspects.

The open-bottomed housing 6 of assembly 2 may have a top portion 8, a mid-portion 10, and a bottom portion 12. In a preferred embodiment, the top portion 8 is dome-shaped, the mid-portion 10 is cylindrical-shape, and the bottom portion 12 is conical-shaped having a wider upper section 14 and a narrow lower section 16. The narrow lower section 16 of the bottom portion 12 may include an opening 18 for conveying the second slurry 24 from inside 22 of the housing 6 to outside 20 of the housing 6, such as to a compartment or component of tank 108. For example, the housing 6 may partially submerged in liquid in a tank 108, wherein the bottom portion 12 of the housing 6 is submerged in the tank 108. The bottom portion 12 of the housing 6 may deposit first solids 110 from the slurry 4 into the tank 108 (FIG. 9). In some embodiments, the bottom portion 12 may be cylindrical in shape with no narrower or wider sections and may have an opening in the bottom.

In a preferred embodiment, the housing 6 may be between about 7 to about 10 feet in length from top to bottom. For example, the housing 6 may be about 8 feet long from top to bottom. According to some aspects, the top portion 8 may be about 8 to about 14 inches tall (e.g., about 12 inches), the mid-portion 10 may be about 5 to about 6 feet tall (e.g., about 66 inches), and the bottom portion 12 may be about 1 to 3 feet tall (e.g., about 22 inches). The housing 6 may be made of metal, such as aluminum and the like. In a preferred embodiment, the housing 6 is configurable in a vertically-raised position and in a vertically-lowered position, such as within the tank 108. When the assembly 2 is in the vertically-lowered position, the assembly 2 may be set about 12-16 inches down from the vertically-raised position.

In some embodiments, the assembly 2 may be configured for transportation when in the vertically-lowered position. To help hold the housing 6 in place when in a lowered position, the housing 6 may include a notch 116 formed in the bottom portion 12, which may engage with a reciprocally-shaped piece 118 associated with the tank 108 to hold the housing 6 in place, such as to secure the housing 6 when in transport (FIG. 9). For example, the notch 116 may be V-shaped or U-shaped.

The housing 6 may include or be coupled to one or more intake conduits 26 extending through an upper part 32 of the mid-portion 10 of the housing 6. According to some aspects, the one or more intake conduits 26 may be configured to receive the slurry 4 recovered from the hydrocarbon well and convey this fluid to inside of the housing 6. For example, an outer portion 34 of an intake conduit 26 may be located outside 20 of the housing 6 and may be coupled to a line or conduit connected to a well to receive the fluid from the well.

Figure 3:
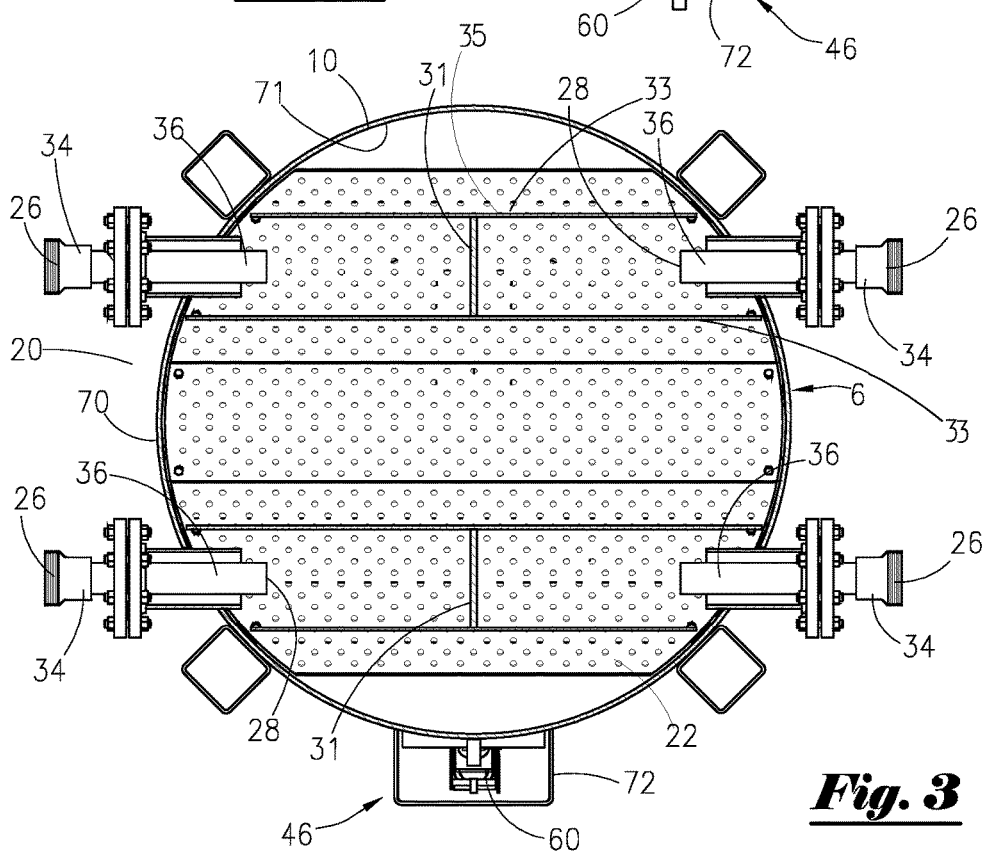
FIG. 3 is a top cross-sectional view of an embodiment of a gas diffusing assembly in accordance with disclosed aspects.

Fluid may be piped into the outer portion 34 and may then be conveyed to an inner portion 36 of the intake conduit 26 located inside 22 the housing 6. In a preferred embodiment, the outer portion 34 the intake conduit 26 includes a hammer union. The inner portion 36 of the intake conduit 26 may include a nozzle 28 (FIG. 3) for conveying fluid to the inside 22 of the housing 6. For example, the fluid flow from the well may come into the intake conduit 26 from the outer portion 34 into the inner portion 36, which may be at least partially enclosed in an open-bottomed inner housing 35 (FIG. 3). The inner housing 35 may have side and top shield portions 33 that couple to a center target plate 31 (FIG. 3). When the fluid comes in, the fluid may be directed to contact the target plate 31 and be shielded by the shield portions 33. The target plate 31 (FIG. 3) may direct the fluid down to one or more baffles 76 below the inner housing 35. In some cases, the target plate 31 may be located at about a midpoint width of the housing 6 between two opposite-facing intake conduits 26. In some embodiments, the inner portion 36 of the intake conduit 26 may include a removable portion, such as a removable conduit.

Figure 4:
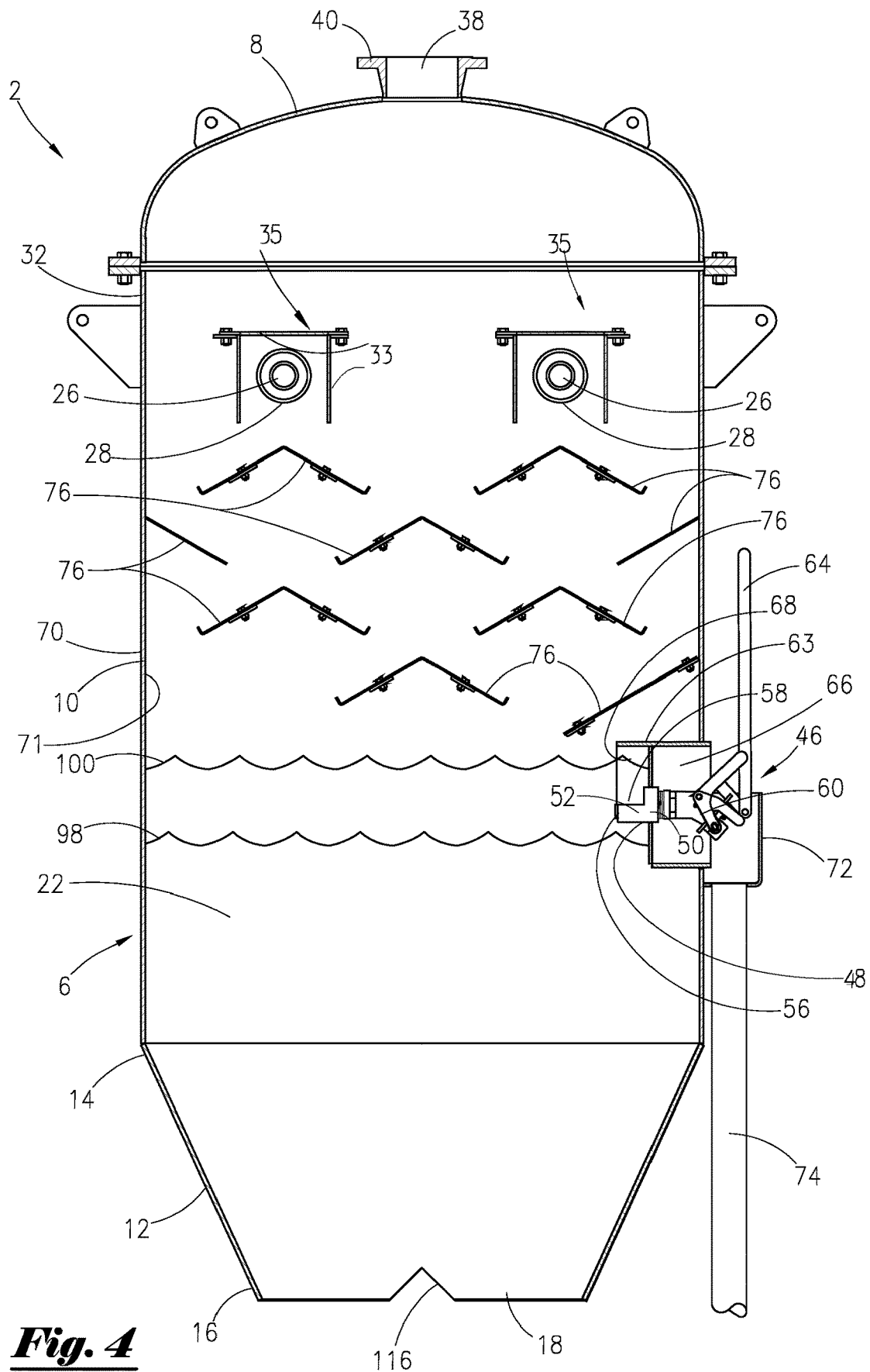
FIG. 4 is a side cross-sectional view of an embodiment of a gas diffusing assembly in accordance with disclosed aspects.
Figure 5:
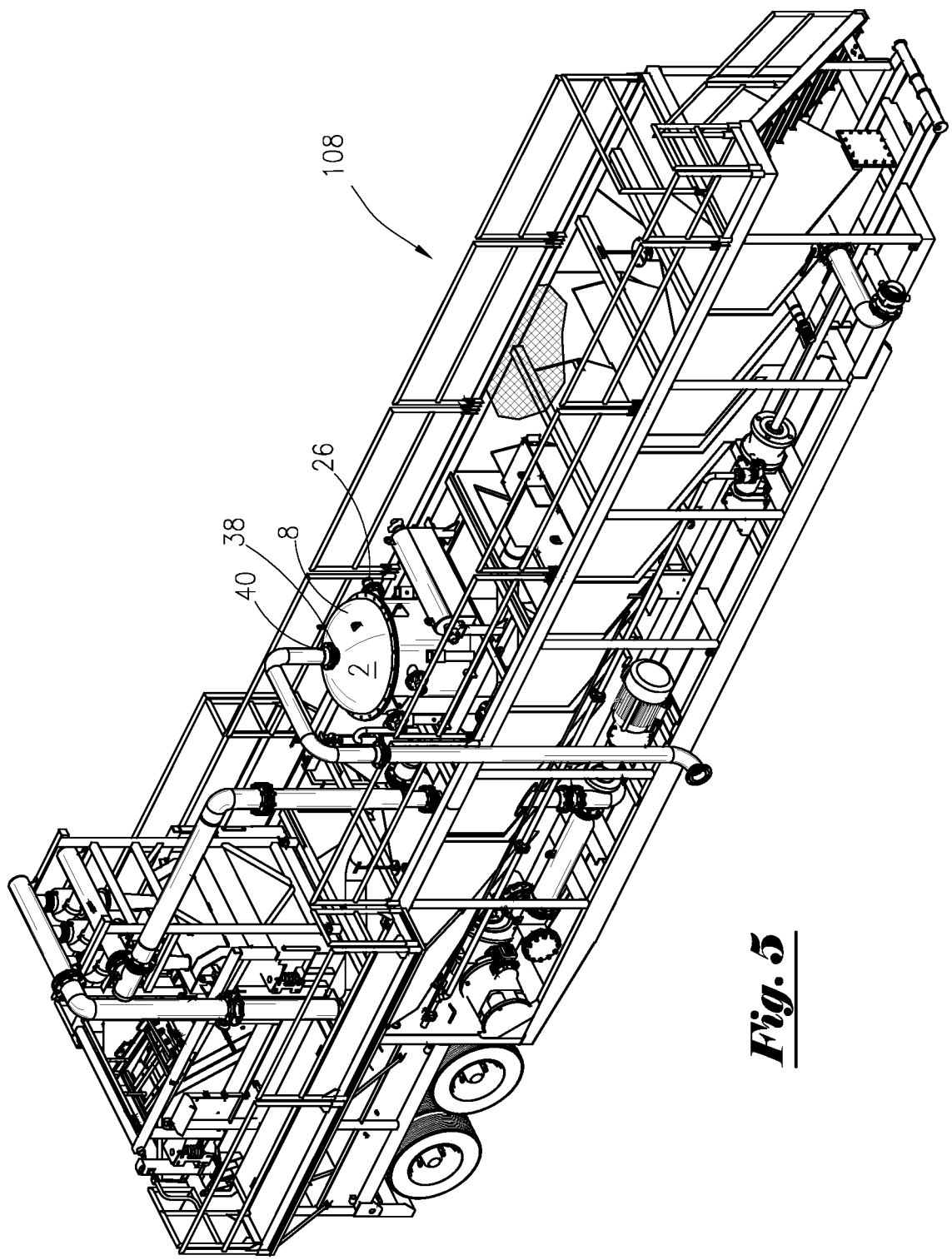
FIG. 5 is a perspective view of an embodiment of a gas diffusing assembly in combination with a tank system in accordance with disclosed aspects.
Figure 6:
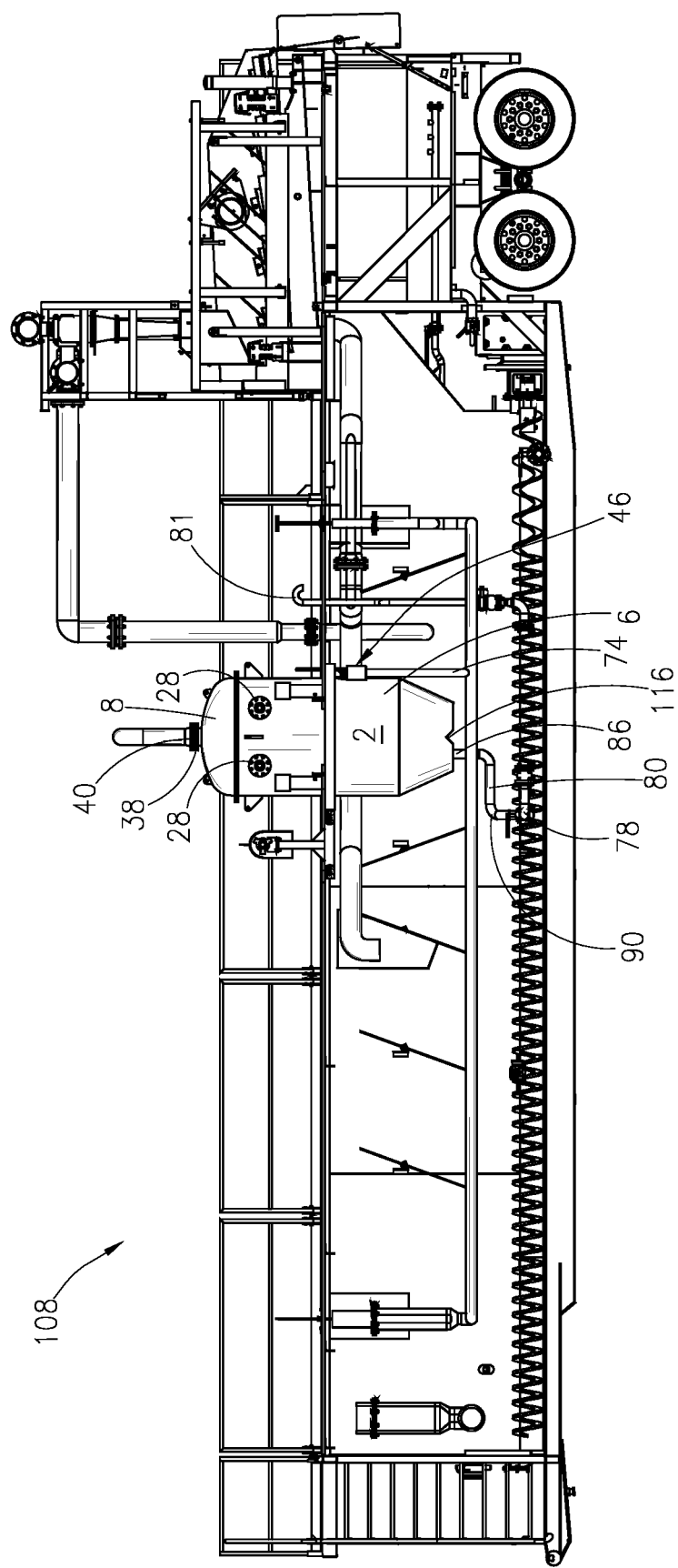
FIG. 6 is a partial cross-sectional view of a first side of a gas diffusing assembly in combination with a tank system in accordance with disclosed aspects.
Figure 7:
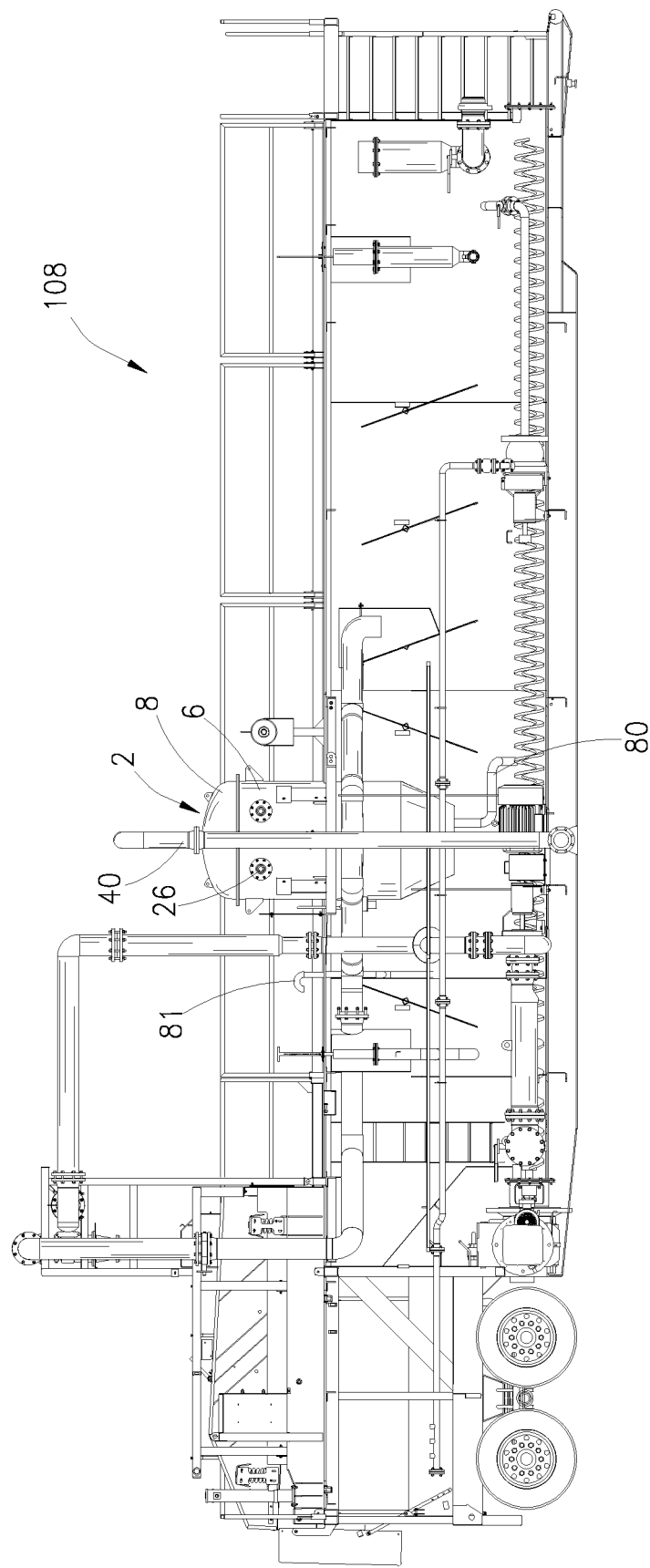
FIG. 7 is a partial cross-sectional view of a second side of a gas diffusing assembly in combination with a tank system in accordance with disclosed aspects.

The housing 6 may include and/or have formed therein a gas diffusing channel 38, such as a channel 38 formed in the top portion 8 of the housing 6. The gas diffusing channel 38 may extend vertically through the top portion 8 of the housing. The gas diffusing channel 38 may convey diffused gas 42 from the slurry 4 from inside 22 of the housing 6 to outside 20 of the housing, such as to the atmosphere. For example, there may be fluid inside of the housing 6 at a particular level, such as a lower fluid level 98. The lower fluid level 98 may depend on (e.g., be about equal to) the amount of fluid in the tank 108 (FIG. 4). In some cases, the level of fluid inside of the housing 6 (e.g., the lower fluid level 98) may be about 14 inches from the top of the tank 108. According to some aspects, the level of fluid inside of the housing 6 (e.g., the lower fluid level 98) may be about 4 feet to about 6 feet below the top of the housing 6. The fluid fills up through the opening 18 in the bottom portion 12 of the housing 6, such as from the fluid in the tank 108. The fluid inside of the housing 6 creates a fluid buffer that forces the gas to go through the gas diffusing channel 38. The fluid buffer creates a pressurized zone so that the gas can rise in the housing 6. In some cases, the distance between the opening 18 and the level of fluid inside of the housing 6 (e.g., the lower fluid level 98) may be about 3 feet to about 5 feet.

The gas diffusing channel 38 may be coupled to a gas diffusing conduit 40 extending above the top portion 8 of the housing 6. For example, the gas diffusing conduit 40 may be or include a flange portion. In some embodiments, the gas diffusing conduit 40 may be a flare line or conduit used to transport the diffused gas toward a flare or some other disposal area.

To help facilitate the diffusing of gas from the slurry 4, the housing 6 may include one or more baffles 76 positioned below the one or more intake conduits 26 for contacting the slurry 4 when diffusing gas from the slurry 4 (FIG. 4). The baffles 76 may be vertically staggered along the length of the housing 6 and across the housing 6. In some cases, at least one of the baffles 76 may have an inverted V-shape. In a preferred embodiment, at least one of the baffles 76 extends from an inner side 71 of the housing 6.

The housing 6 may include a dumping assembly 46 positioned at about the mid-portion 10 of the housing 6, such as being positioned below one or more intake conduits 26 and/or one or more baffles 76. The dumping assembly 46 may include an inner conduit 48, a dump valve 60 coupled to (e.g., threadedly) the inner conduit 48, and a sump vessel 72 located adjacent to the dump valve 60. The inner conduit 48 may extend into the housing 6 and may have first and second ends 50, 52, and the first end 50 may include a collar coupled at and/or to the wall of the housing 6. The first end 50 of the inner conduit 48 may be coupled to (e.g., threadedly) the dump valve 60 located outside of the wall of the housing 6 at an outer side 70 of the housing 6 at about the mid-portion 10. The first end 50 may be coupled to the wall of the housing 6 between the outer side 70 and the inner side 71 of the housing 6 at about the mid-portion 10 of the housing 6. The second end 52 of the inner conduit 48 may be located inside of the wall of the housing 6 (i.e., inside 22 of the housing 6). In some embodiments, the second end 52 of the inner conduit 48 may have a closed or capped end 56 and an upward facing hole 58. The upward facing hole 58 may be a cut out of the inner conduit 48. In some cases, the dumping assembly 46 may be a port or hole on the side of the housing 6 that may couple to the dump valve 60. In some embodiments, the inner conduit 48 may be or couple at this port.

In a preferred embodiment, the valve 60 may couple to the first end 50 of the inner conduit 48 in a first recess compartment 66, which may be formed outside 20 of the housing 6, such as in a wall of the housing 6. The second end 52 of the inner conduit 48 of the dumping assembly 46 may be positioned in a second recess compartment 68 located inside 22 of the housing 6. The first end 50, which may include a collar, may span the wall of the housing from the outer side 70 to the inner side 71. The first and second recess compartments 66, 68 may be positioned adjacent to each other, and, in some cases, the second recess compartment 68 may be smaller than the first recess compartment 66. In some cases, there may be a commonly shared wall 63 on the topside of the recess compartments 66, 68. The wall 63 may function to prevent solids from falling into the upward facing hole 58 from inside 22 of the housing 6. In some embodiments, wall 63 may have a round shape surrounding the inner conduit 48 and/or the dump valve 60.

The dump valve 60 may be connected to the first end 50 of the inner conduit 48, which may extend from an outer side 70 of the housing 6 at about the mid-portion 10. In some embodiments, the dump valve 60 may be located partially (or fully) inside the sump 72, and a lower side of the sump 72 may be located below a nozzle of the dump valve 60 for collecting fluid exiting the dump valve 60. For example, after opening the dump valve 60, the dump valve 60 may convey fluid from an upper layer of fluid 100 located inside 22 of the housing 6 to outside 20 of the housing 6, such as to the sump 72, which may be conveyed to a skimmed-fluid conduit 74 coupled to the sump 72.

In an exemplary situation, a fluid less dense than water, such as a hydrocarbon fluid (oil and the like), can build up inside 22 of the housing 6 on the lower layer of fluid 98, and the dump valve 60 can be used as a skimmer-type device to skim and remove the oil from the upper layer of fluid 100. For example, the dump valve 60 can be placed about three inches above the lower fluid level 98. After oil builds up an about three-inch layer (or greater) on the lower layer of fluid 98, shown as the upper layer of fluid 100 in FIG. 4, the dump valve 60 can be opened to skim off the oil from inside of the housing 6. The oil can be conveyed to the sump 72, and the sump 72 can convey it to a hose or conduit (skimmed-fluid conduit 74) connected to the sump 72 (FIG. 9). The skimmed-fluid conduit 74 can convey the skimmed oil to an oil manifold, which may connect to and collect oil from oil skimmers coupled to or associated with the tank 108.

In some embodiments, the skimmed fluid may be conveyed to the skimmed-fluid conduit 74 directly from the valve 60. In some embodiments, the upper layer of fluid 100 may include a hydrocarbon fluid, such as oil, which may collect inside of the housing 6 when the tank 108 is in operation. The upper layer of fluid 100 may be on top of the lower fluid level 98 inside of the housing. The dump valve 60 may be placed at a location above a lower fluid level 98 associated with the housing 6, wherein after fluid inside 22 of the housing 6 is above the lower fluid level 98, fluid from inside 22 of the housing 6 flows over the closed end 56 and into the upward facing hole 58 into the inner conduit 48. After the level of fluid inside 22 of the housing 6 drops, the fluid stops flowing into the upward facing hole 58 and the valve 60 can be closed.

In a preferred embodiment, the valve 60 may be coupled to a spring-loaded handle 62 used to open and close the valve 60. After the spring-loaded handle 62 is pulled and opened, it can be released to close the valve 60. In some embodiments, an elongated lever 64 may be coupled to the valve 60 and/or to the spring-loaded handle 62, where the lever 64 extends from the spring-loaded handle 62 to above the valve 60. In some embodiments, the lever 64 may extend above the top portion 8 of the housing 6, such that an operator may operate the level 64 to control the valve 60. In some embodiments, the valve 60 may be a ball valve, a butterfly valve, a plug valve, and the like.

In some embodiments, the assembly 2 may include a suction conduit 80 coupled to a recirculation pump 78 located near and/or adjacent to the housing 6 (FIGS. 6-9). A first end 82 of the suction conduit 80 may include an intake portion 84 positioned in the housing 6. A mid-section 86 of the suction conduit 80 extends through the opening 18 in the bottom portion 12 (e.g., in the narrow lower section 16 of the bottom portion 12) of the housing 6. A second end 90 of the suction conduit 80 is coupled to the recirculation pump 78. The intake portion 84 may include an opening in the conduit 80 for receiving fluid from inside of the housing 6. The intake portion 84 may be placed about 6 inches below the lower fluid level 98 in the housing 6.

The recirculation pump 78 may be configured to pump fluid taken in at the intake portion 84 from inside 22 of the housing 6 through the suction conduit 80. For example, the recirculation pump 78 may be activated based on the presence (or expectation of) color-dyed fluid 106 inside 22 of the housing 6 (FIG. 9), such as during a sweep dye process. For example, when using tank 108, a sweep dye process can be performed where a dyed fluid is run through the well and that dyed fluid is recovered from the well. When that dyed fluid is expected to be inside 22 of the housing (or when it is in the housing 6), it can be determined that the fluid has completed the journey down and up the well. After fluid (color-dyed fluid 106) is run through the tank 108, it may settle in housing 6, and the pump 78 may pump the color-dyed fluid 106 through the intake portion 84 through the suction conduit 80 and through a discharge conduit 81 coupled to the pump 78. According to some aspects, the pump 78 may be operated to suction after that color-dyed fluid 106 is present in the housing 6, or in some embodiments, after the color-dyed fluid 106 is expected to be in the housing 6 based on the duration of the sweep dye process. In some embodiments, the discharge conduit 81 may be curved downward at an opened terminal end.

Figure 8:
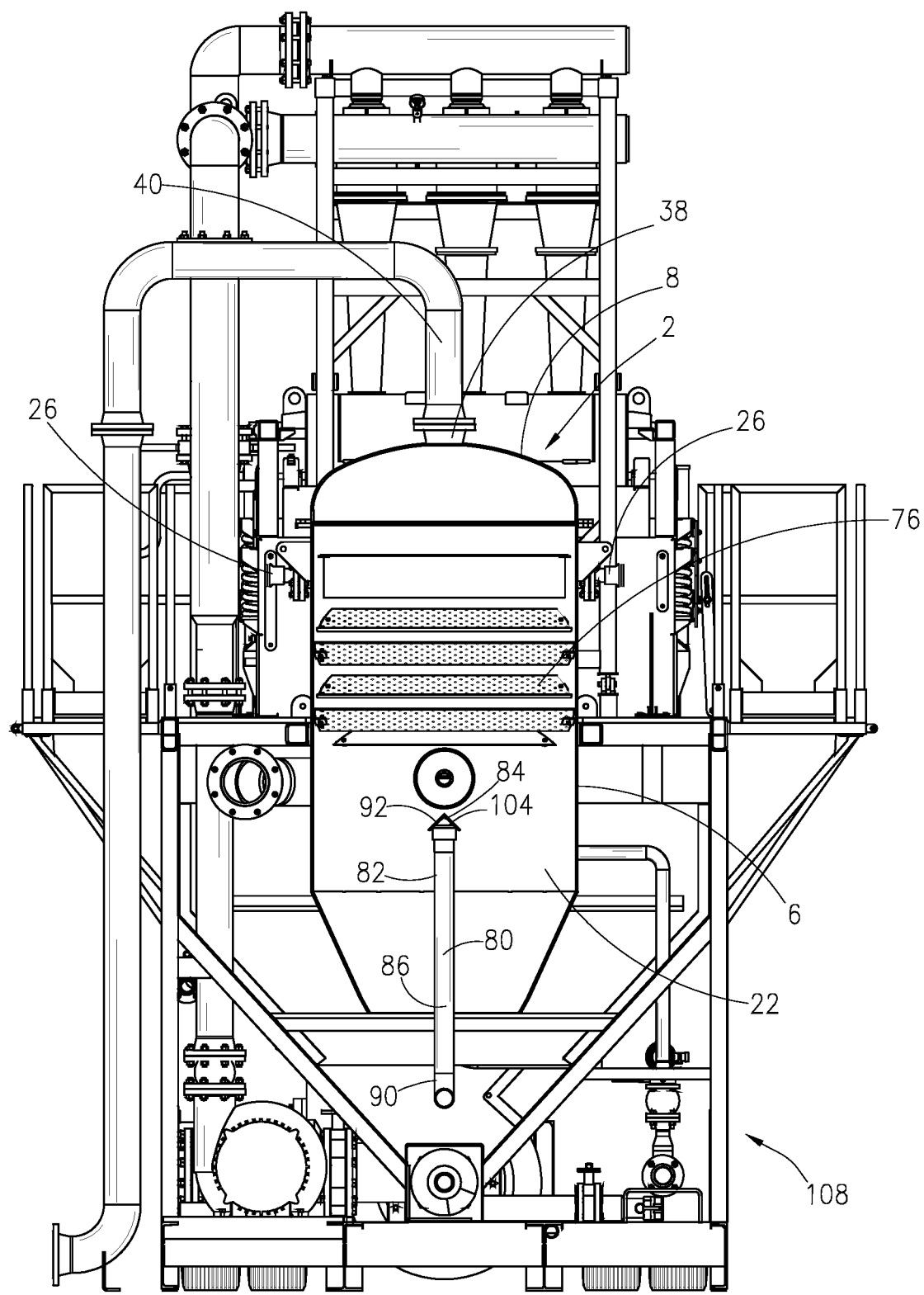
FIG. 8 is a rear view of a gas diffusing assembly in combination with a tank system in accordance with disclosed aspects.

In some cases, the intake portion 84 may include a tented member 92 on top of the opening in the intake portion 84 (FIG. 8). The tented member 92 may function to block solids from dropping into the suction conduit 80. According to some aspects, the intake portion 84 may be positioned below a lower fluid level 98 inside 22 of the housing 6. For example, an upper portion 104 of the tented member 92 may be positioned below a lower fluid level 98 inside 22 of the housing 6. The recirculation pump 78 may be positioned in the tank 108 in some embodiments. In a preferred embodiment, the recirculation pump 78 may be a diaphragm recirculation pump 78.

According to features described herein, dimensions are approximate and may be scaled to size based on desired sizing and scaling.

The term "about" as used herein will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or possibly as much as +/−20%. Similarly, the term "substantially" will typically mean at least 85% to 99% of the characteristic modified by the term. For example, "substantially all" will mean at least 85%, at least 90%, or at least 95%, etc.

While preferred embodiments of the present disclosure have been described, it is to be understood that the embodiments described are illustrative only and that the scope of the invention is to be defined solely by the appended claims when accorded a full range of equivalents, many variations and modifications naturally occurring to those skilled in the art from a perusal hereof.

What is claimed is:

1. An assembly for diffusing gas from a first slurry recovered from a hydrocarbon well, comprising:
    an open-bottomed housing having a top portion, a mid-portion, and a bottom portion, wherein the bottom portion includes an opening configured for conveying a second slurry from inside of the housing to outside of the housing;
    one or more intake conduits extending through the mid-portion of the housing, the one or more intake conduits being configured to receive the first slurry recovered from the hydrocarbon well via an outer portion of each of the one or more intake conduits located outside of the housing and to convey the first slurry to an inner portion of each of the one or more intake conduits located inside the housing;
    a gas diffusing channel formed in the housing and extending vertically through the top-portion of the housing, wherein the gas diffusing channel is configured to convey diffused gas from the first slurry from inside of the housing to outside of the housing; and
    a dumping assembly comprising:
        a port located at the mid-portion of the housing; and
        a dump valve coupled to the port at the mid-portion.

2. The assembly of claim 1, further comprising:
    a recirculation pump; and
    a suction conduit coupled to the recirculation pump, wherein a first end of the suction conduit comprises an intake portion positioned in the housing, a mid-section of the suction conduit extends through the opening in the bottom portion of the housing, and a second end of the suction conduit is coupled to the recirculation pump.

3. The assembly of claim 2, wherein the intake portion comprises an opening in the suction conduit and is located below a fluid level in the housing.

4. The assembly of claim 3, wherein the intake portion comprises a tented member positioned below the fluid level inside of the housing.

5. The assembly of claim 2, wherein the recirculation pump is a diaphragm recirculation pump.

6. The assembly of claim 2, wherein the recirculation pump is configured to pump fluid from inside of the housing through the suction conduit to a discharge conduit.

7. The assembly of claim 2, wherein the recirculation pump is activated based on color-dyed fluid inside of the housing.

8. The assembly of claim 1, wherein the housing is partially submerged in liquid in a tank, wherein the bottom portion of the housing is configured to be submerged in the tank.

9. The assembly of claim 8, wherein the bottom portion of the housing is configured to deposit first solids from the first slurry into the tank.

10. The assembly of claim 1, wherein the housing is between about 7 to about 10 feet in length.

11. The assembly of claim 1, wherein the housing is configurable in a vertically-raised position and a vertically-lowered position within a tank.

12. The assembly of claim 11, wherein the assembly is configured for transportation when in the vertically-lowered position.

13. The assembly of claim 11, wherein the housing, in the vertically-lowered position, is set about 12-16 inches down from the vertically-raised position.

14. The assembly of claim 1, wherein the inner portion of at least one of the one or more intake conduits comprises a nozzle configured to convey fluid to a corresponding target plate located inside of the housing.

15. The assembly of claim 1, wherein the inner portion of at least one of the one or more intake conduits comprises a removable conduit.

16. The assembly of claim 1, wherein the outer portion of at least one of the one or more intake conduits comprises a hammer union.

17. The assembly of claim 1, wherein the dumping assembly further comprises:
    an inner conduit extending into the housing at the port and having first and second ends, wherein the first end of the inner conduit is coupled to the housing at the mid-portion of the housing and is coupled to the dump valve, and the second end of the inner conduit extends into the housing and has a closed end and an upward facing hole.

18. The assembly of claim 17, wherein at least a portion of the first end of the inner conduit and at least a portion of the dump valve are positioned in a first recess compartment formed outside of the housing in a wall of the housing and the second end of the inner conduit of the dumping assembly is positioned in a second recess compartment inside of the housing, wherein the first and second recess compartments are adjacent to each other.

19. The assembly of claim 18, wherein the second recess compartment is smaller than the first recess compartment.

20. The assembly of claim 1, wherein responsive to opening the dump valve, the dump valve is configured for conveying fluid from an upper layer of fluid located inside of the housing to outside of the housing.

21. The assembly of claim 20, further comprising a sump located adjacent to the dump valve for collecting fluid exiting the dump valve, wherein the fluid from the upper layer of fluid is conveyed to the sump.

22. The assembly of claim 21, wherein the fluid from the upper layer of fluid is conveyed from the sump to a skimmed-fluid conduit coupled to the sump.

23. The assembly of claim 20, wherein the fluid from the upper layer of the fluid is conveyed to a skimmed-fluid conduit.

24. The assembly of claim 20, wherein the fluid from the upper layer of fluid includes a hydrocarbon fluid.

25. The assembly of claim 1, wherein the dump valve is located at a location above a fluid level inside of the housing.

26. The assembly of claim 1, wherein the dump valve is opened responsive to rising of a level of fluid inside of the housing; wherein responsive to the level of fluid inside of the housing dropping, the dump valve is closed.

27. The assembly of claim 1, wherein the dump valve is coupled to a spring-loaded handle that opens and closes the dump valve.

28. The assembly of claim 27, wherein an elongated lever is coupled to the spring-loaded handle, wherein the lever extends from the spring-loaded handle to above the top portion of the housing.

29. The assembly of claim 1, wherein the valve is a ball valve, a butterfly valve, or a plug valve.

30. The assembly of claim 1, wherein the housing includes one or more baffles for contacting the first slurry to diffuse gas from the first slurry.

31. The assembly of claim 30, wherein the housing includes a plurality of vertically staggered baffles.

32. The assembly of claim 30, wherein at least one of the baffles includes an inverted V-shape.

33. The assembly of claim 30, wherein at least one of the one or more baffles extends from an inner side of the housing.

34. The assembly of claim 1, wherein the housing includes a notch formed in the bottom portion.

35. The assembly of claim 1, wherein the gas diffusing channel is coupled to a gas diffusing conduit extending above the top portion of the housing.

36. A method of diffusing gas from a first slurry recovered from a hydrocarbon well, comprising:
(a) providing an assembly for diffusing gas from the first slurry recovered from a hydrocarbon well, comprising: an open-bottomed housing having a top portion, a mid-portion, and a bottom portion, wherein the bottom portion includes an opening configured for conveying a second slurry from inside of the housing to outside of the housing; one or more intake conduits extending through the mid-portion of the housing, the one or more intake conduits being configured to receive the first slurry recovered from the hydrocarbon well via an outer portion of each of the one or more intake conduits located outside of the housing and to convey the first slurry to an inner portion of each of the one or more intake conduits located inside the housing; a gas diffusing channel formed in the housing and extending vertically through the top-portion of the housing, wherein the gas diffusing channel is configured to convey diffused gas from the first slurry from inside of the housing to outside of the housing; and a dumping assembly comprising: a port located at the mid-portion of the housing; and a dump valve coupled to the port at the mid-portion;
(b) submerging the housing in liquid in a vessel;
(c) receiving the first slurry inside of the housing via the one or more intake conduits; and
(d) diffusing gas from the first slurry.

37. The method of claim 36, further comprising:
(e) depositing solids from the first slurry into the vessel through the opening in the bottom portion in the housing.

38. The method of claim 36, further comprising:
(e) opening the dump valve; and
(f) conveying fluid from an upper layer of fluid located inside of the housing to outside of the housing via the dump valve.

39. The method of claim 38, wherein the fluid from the upper layer of fluid includes a hydrocarbon fluid.

40. The method of claim 38, further comprising:
(g) closing the dump valve responsive to a level of fluid inside of the housing dropping.

* * * * *